United States Patent [19]
Lee et al.

[11] Patent Number: 5,511,094
[45] Date of Patent: Apr. 23, 1996

[54] SIGNAL PROCESSOR FOR A SUB-BAND CODING SYSTEM

[75] Inventors: Suk-jeong Lee; Hyung-nam Byeon, both of Seoul, Rep. of Korea

[73] Assignee: Samsung Electronics Co., Ltd., Kyungki, Rep. of Korea

[21] Appl. No.: 224,968

[22] Filed: Apr. 8, 1994

[30] Foreign Application Priority Data

Apr. 8, 1993 [KR] Rep. of Korea ............... 1993-5900

[51] Int. Cl.$^6$ ................................................ H04B 14/04
[52] U.S. Cl. ........................... 375/243; 375/241; 381/30
[58] Field of Search ........................... 375/240, 241, 375/243; 395/2.15, 2.21, 2.2, 2.38, 3.39; 381/30, 31, 32

[56] References Cited

U.S. PATENT DOCUMENTS

| | | | |
|---|---|---|---|
| 5,105,463 | 4/1992 | Veldhuis et al. | 381/30 |
| 5,214,678 | 5/1993 | Rault et al. | 375/240 |
| 5,301,255 | 4/1994 | Nagai et al. | 395/2.1 |

*Primary Examiner*—Stephen Chin
*Assistant Examiner*—Timothy J. May
*Attorney, Agent, or Firm*—Sughrue, Mion, Zinn, Macpeak & Seas

[57] ABSTRACT

A signal processor for a sub-band coding system includes a selector receiving various data, i.e., sample data, allocation information, synchronization and system information during encoding, changing the various data into appropriate forms for efficient encoding the various data and generating same, a memory temporarily storing various data received from the selector, an operator for selectively scaling and quantizing sample data and dequantizing and descaling encoded data, classifier providing outputting the operated data, allocation information input to the operating means, and system information as encoded data in accordance with the frame format of a general sub-band coding system, or receiving and classifying the encoded data into system information, allocation information and operated data, and a control signal generator for generating control signals for controlling the encoding and decoding of the selector, memory, operator and classifier circuits. Therefore, since encoding and decoding are performed with a single signal processor circuit, the circuitry advantageously can be simplified.

10 Claims, 11 Drawing Sheets

TABLE 1.

| q | B | QUANTIZATION | COEFFICIENTS A |
|---|---|---|---|
| 2 | -0.25 | =1 11 | 0.75 =0 11 |
| 3 | -0.125 | =1 111 | 0.875 =0 111 |
| 4 | -0.0625 | =1 1111 | 0.9375 =0 1111 |
| 5 | -0.03125 | =1 11111 | 0.96875 =0 11111 |
| 6 | -0.015625 | =1 111111 | 0.984375 =0 111111 |
| 7 | -0.0078125 | =1 1111111 | 0.9921875 =0 1111111 |
| 8 | -0.00390625 | =1 11111111 | 0.99609375 =0 11111111 |
| 9 | -0.001953125 | =1 111111111 | 0.998046875 =0 111111111 |
| 10 | -0.0009765625 | =1 1111111111 | 0.9990234375 =0 1111111111 |
| 11 | -0.00048828125 | =1 11111111111 | 0.99951171875 =0 11111111111 |
| 12 | -0.000244140625 | =1 111111111111 | 0.999755859375 =0 111111111111 |
| 13 | -0.0001220703125 | =1 1111111111111 | 0.9998779296875 =0 1111111111111 |
| 14 | -0.00006103515625 | =1 11111111111111 | 0.99993896484375 =0 11111111111111 |
| 15 | -0.000030517578125 | =1 111111111111111 | 0.999969482421875 =0 111111111111111 |

FIG. 9

TABLE 2.

| q | C | DEQUANTIZATION D | COEFFICIENTS |
|---|---|---|---|
| 1 | | | |
| 2 | 1.333333333 | 0.5 | =0.1 |
| 3 | 1.142857143 | 0.25 | =0.01 |
| 4 | 1.066666667 | 0.125 | =0.001 |
| 5 | 1.032258065 | 0.0625 | =0.0001 |
| 6 | 1.015873016 | 0.03125 | =0.00001 |
| 7 | 1.007874016 | 0.015625 | =0.000001 |
| 8 | 1.003921569 | 0.0078125 | =0.0000001 |
| 9 | 1.001956947 | 0.00390625 | =0.00000001 |
| 10 | 1.000977517 | 0.001953125 | =0.000000001 |
| 11 | 1.000488520 | 0.0009765625 | =0.0000000001 |
| 12 | 1.000244200 | 0.00048828125 | =0.00000000001 |
| 13 | 1.000122085 | 0.000244140625 | =0.000000000001 |
| 14 | 1.000061039 | 0.0001220703125 | =0.0000000000001 |
| 15 | 1.000030519 | 0.00006103515625 | =0.00000000000001 |

FIG. 10

| q | (1−C)=K | | |
|---|---|---|---|
| 2 | 0.333333333333 | = 0 | 01010101010101010101011 |
| 3 | 0.142857142857143 | = 0 | 00100100100100100100101 |
| 4 | 0.066666666666667 | = 0 | 00010001000100010001001 |
| 5 | 0.032258064516129 | = 0 | 00001000010000100001000 |
| 6 | 0.015873015873016 | = 0 | 00000100000100000100001 |
| 7 | 0.007874015748032 | = 0 | 00000010000001000000100 |
| 8 | 0.003921568627451 | = 0 | 00000001000000010000001 |
| 9 | 0.001956947162427 | = 0 | 00000000100000000100000 |
| 10 | 0.000977517106549 | = 0 | 00000000010000000001000 |
| 11 | 0.000488519785051 | = 0 | 00000000001000000000010 |
| 12 | 0.000244200244200 | = 0 | 00000000000100000000001 |
| 13 | 0.000122208521548 | = 0 | 00000000000010000000000 |
| 14 | 0.000061038881768 | = 0 | 00000000000001000000000 |
| 15 | 0.000030518509476 | = 0 | 00000000000000100000000 |

FIG. 11

| INDEX | MAG. | dB |
|---|---|---|
| 0 | 2.00000000000000 | +6 |
| 1 | 1.58740105196820 | +4 |
| 2 | 1.25992104989487 | +2 |
| 3 | 1.00000000000000 | 0 |
| 4 | 0.79370052598410 | −2 |
| 5 | 0.62996052494744 | −4 |
| 6 | 0.50000000000000 | −6 |
| 7 | 0.39685026299205 | −8 |
| 8 | 0.31498026247372 | −10 |
| 9 | 0.25000000000000 | −12 |
| 10 | 0.19842513149601 | −14 |
| 11 | 0.15749013123686 | −16 |
| 12 | 0.12500000000000 | −18 |
| 13 | 0.09921256574801 | −20 |
| 14 | 0.07874506561843 | −22 |
| 15 | 0.06250000000000 | −24 |
| 16 | 0.04960628287401 | −26 |
| 17 | 0.03937253280921 | −28 |
| 18 | 0.03125000000000 | −30 |
| 19 | 0.02480314143700 | −32 |
| 20 | 0.01968626640461 | −34 |
| 21 | 0.15625000000000 | −36 |
| 22 | 0.01240157070850 | −38 |
| 23 | 0.00984313320230 | −40 |
| 24 | 0.00781250000000 | −42 |
| 25 | 0.00620078535925 | −44 |
| 26 | 0.00492156660115 | −46 |
| 27 | 0.00390625000000 | −48 |
| 28 | 0.00310039267963 | −50 |
| 29 | 0.00246078330058 | −52 |
| 30 | 0.00195312500000 | −54 |
| 31 | 0.00155019633981 | −56 |
| 32 | 0.00123039165029 | −58 |
| 33 | 0.00097656250000 | −60 |
| 34 | 0.00077509816991 | −62 |
| 35 | 0.00061519682514 | −64 |
| 36 | 0.00048828125000 | −66 |
| 37 | 0.00038754908495 | −68 |
| 38 | 0.00030759791257 | −70 |
| 39 | 0.00024414062500 | −72 |
| 40 | 0.00019377454248 | −74 |
| 41 | 0.00015379895629 | −76 |
| 42 | 0.00012207031250 | −78 |
| 43 | 0.00009688727124 | −80 |
| 44 | 0.00007689947814 | −82 |
| 45 | 0.00006103515625 | −84 |
| 46 | 0.00004844363562 | −86 |
| 47 | 0.00003844973907 | −88 |
| 48 | 0.00003051757813 | −90 |
| 49 | 0.00002422181781 | −92 |
| 50 | 0.00001922486954 | −94 |
| 51 | 0.00001525878906 | −96 |
| 52 | 0.00001211090890 | −98 |
| 53 | 0.00000961243477 | −100 |
| 54 | 0.00000762939453 | −102 |
| 55 | 0.00000605545445 | −104 |
| 56 | 0.00000480621738 | −106 |
| 57 | 0.00000381469727 | −108 |
| 58 | 0.00000302772723 | −110 |
| 59 | 0.00000240310869 | −112 |
| 60 | 0.00000190734863 | −114 |
| 61 | 0.00000151386361 | −116 |
| 62 | 0.00000120155435 | −118 |

SIGNAL PROCESSOR FOR A SUB-BAND CODING SYSTEM

BACKGROUND OF THE INVENTION

1. Field of the Invention

The present invention relates to a digital audio system and, more particularly, to a signal processor for providing both sub-band coding and decoding in a digital audio system.

Korean Patent Application No. 93-5900 is incorporated herein by reference for all purposes.

2. Brief Discussion of Related Art

Figure 1:
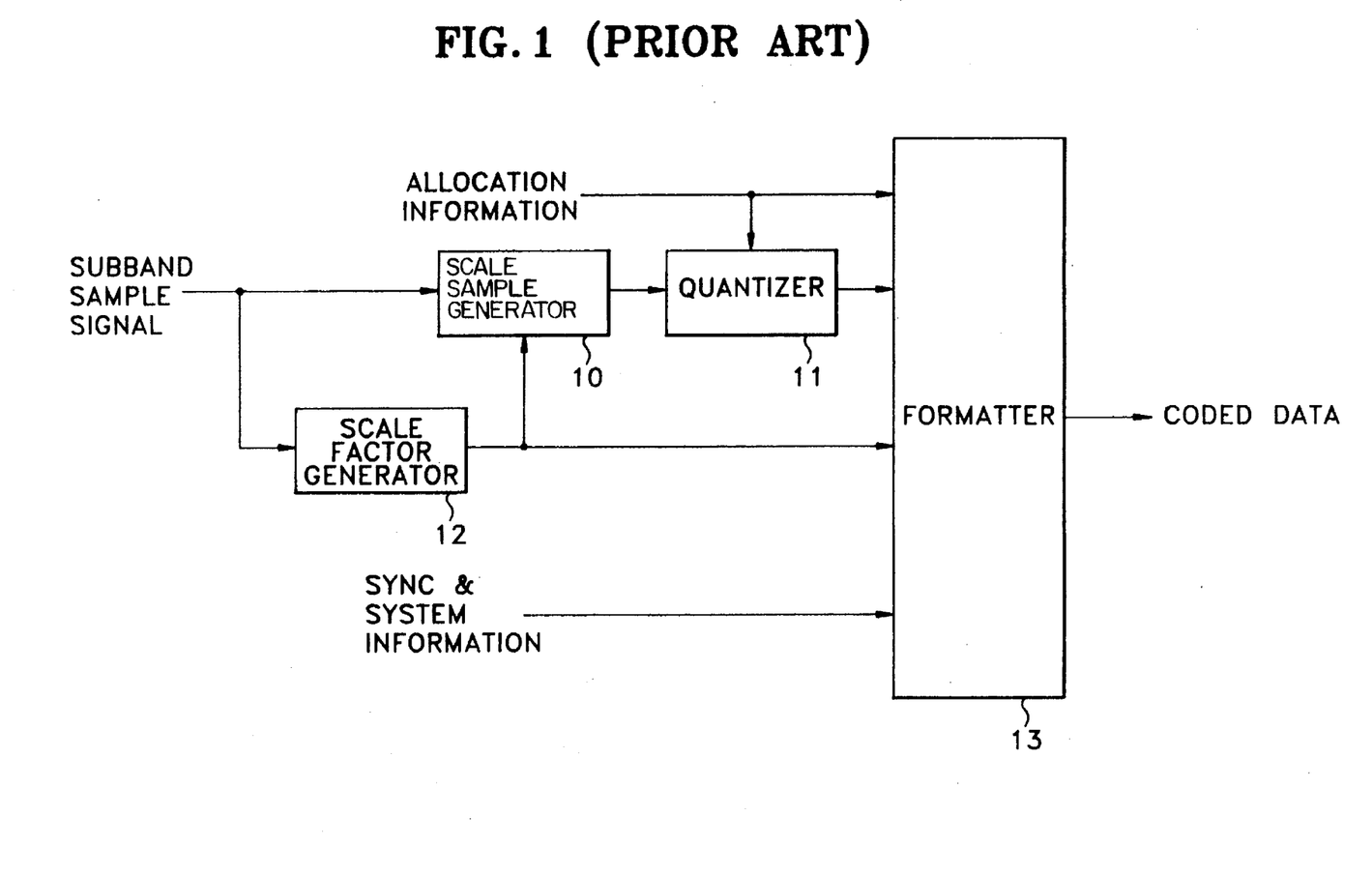
FIG. 1 is a block diagram of an encoder for performing data encoding in a conventional general sub-band coding system.

FIG. 1 shows an encoder for performing data encoding in a conventional universal sub-band coding system developed through a joint effort by the CCETT in France, the IRT in Germany and Philips in the Netherlands. The encoding block of the sub-band coding system is composed of a scale sample generator 10, a quantizer 11, a scale factor generator 12 and a formatter 13.

The operation of the sub-band coding system utilizing the configuration discussed above will now be briefly described.

It will be noted that each of 32 sub-bands of a frame signal is represented by 12 samples, thus 384 sub-band samples are included in each frame. The sample with the highest amplitude of each sub-band is used to determine a scale factor for every respective sub-band. Then, the samples are scaled by the respective scale factor in order for them to be normalized with respect to the value representing the highest amplitude.

One part of the encoding algorithm will have to supply an allocation information table, e.g., information regarding word length for each sub-band in the frame. It will be noted that it is possible to generate the allocation information table in various ways, the simplest way being to use the allocation information table in which all entries are fixed. However, this information may also change with every frame.

The samples are then quantized to reduce the number of bits of the samples to the number specified for the sub-band in the allocation information table and, then, the synchronization and system information is added to produce a formatted frame.

Figure 2:
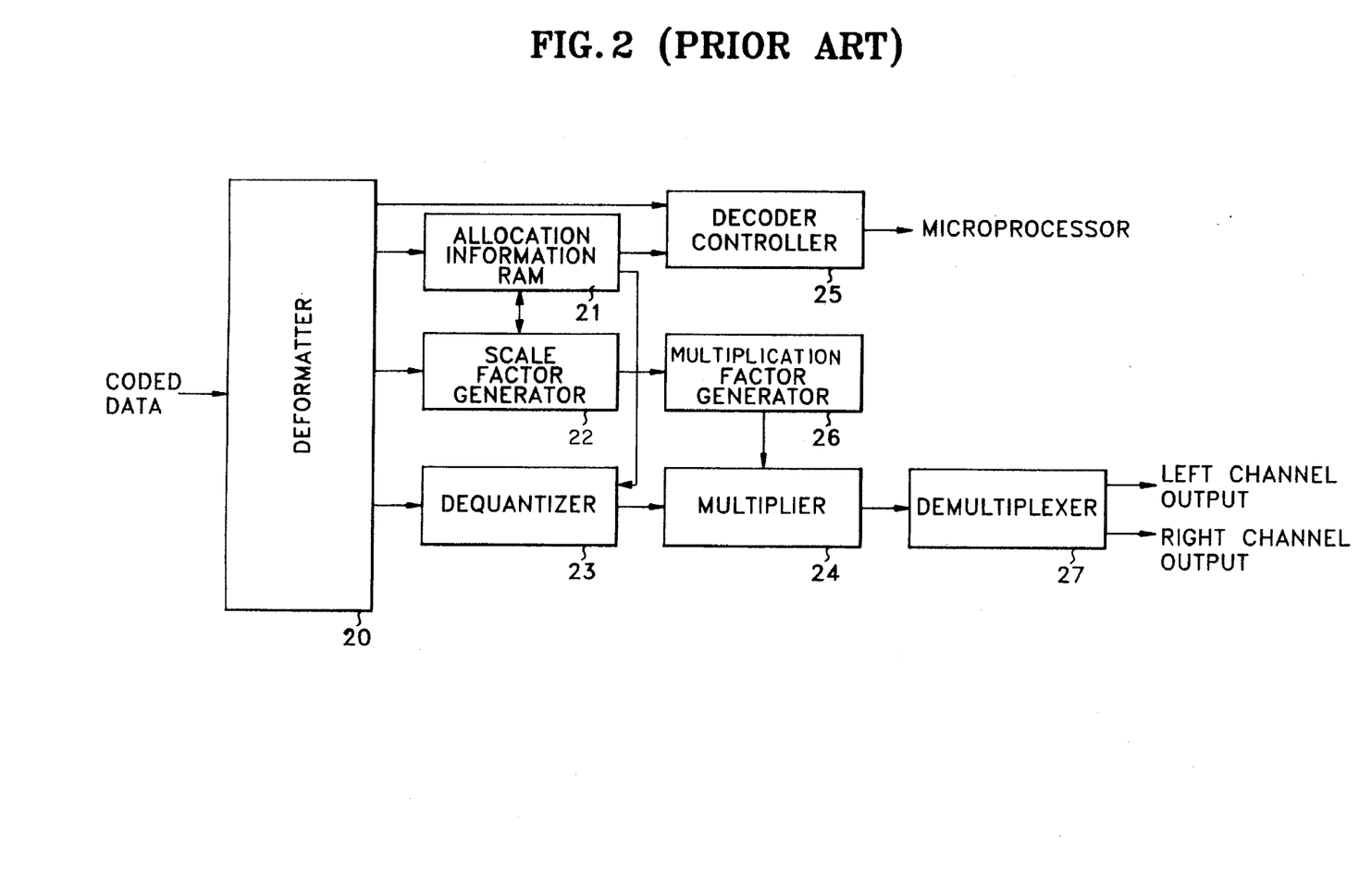
FIG. 2 is a block diagram of an decoder for performing data decoding in a conventional general sub-band coding system.

FIG. 2 shows a decoding block of a general sub-band coding system employed in the decoder according to the CCETT/IRT/Philips technique. The decoding block of the sub-band coding system includes a deformatter 20, an allocation information RAM 21, a scale factor generator 22, a dequantizer 23, a multiplier 24, a decoder controller 25, a multiplication factor generator 26 and a demultiplexer 27.

The decoding operation of the sub-band coding system according to the above configuration will now be described. It will be noted that the decoding process is always performed in the same manner. The essential information is decoded using the scale factor and the sub-band samples. All other information is included so as to permit the decoding to be performed correctly. The decoding process is repeated for every frame. After the reception of the synchronization and system information, the allocation information is used in storing the scale factor array correctly in generator 22.

The scale factor array is an array with two columns, 6 bits wide, and 32 rows. Each column corresponds to one of the output channels and each row corresponds to one of the 32 sub-bands. The received scale factors are stored in this array. The location of a scale factor which has not been transferred becomes 1111111, indicating that the output samples for that sub-band are all "0".

In stereo and bilingual modes, the scale factors for the two channels are stored in the two columns of the array. In mono mode, the same scale factor is stored in both columns of the array.

It will be noted that the scale factors are used as an index into a fixed table. This table contains the multiplication factors by which the sub-band samples have to be multiplied before they are sent to join transform implemented in the encoder. These scale factors are then used for both encoding and decoding operations.

In other words, the encoding block or circuit is independent of and separated from the decoding block or circuit in the conventional general sub-band coding system, making the configuration of the player/recorder very complex.

SUMMARY OF THE INVENTION

The principal object of the present invention is to provide a signal processor for a sub-band coding system whose circuit configuration is simplified by combining the encoding and decoding function employed by a conventional general sub-band coding system in one single signal processor block.

This and other objects, features and advantages according to the present invention are provided by an encoding and decoding system including:

- selecting means for receiving various data, i.e., sample data, allocation information, synchronization and system information at a time of encoding, changing such data into appropriate forms and outputting same;
- storing means for temporarily storing the various data received from the selecting means;
- operating means for scaling and quantizing sample data and for dequantizing and descaling encoded data;
- classifying means for outputting as encoded data operated data, allocation information input to the operating means and system information, in accordance with the frame format of a general sub-band coding system, and for receiving and classifying the encoded data again into system information, allocation information and operated data; and
- a control signal generating means for generating control signals for controlling encoding and decoding accomplished cooperatively the selecting, storing, operating and classifying means.

BRIEF DESCRIPTION OF THE DRAWINGS

The above objects and advantages of the present invention will become more apparent by describing in detail a preferred embodiment thereof with reference to the attached drawings in which:

FIG. 11 is a table showing index values and scale factors.

DETAILED DESCRIPTION OF THE PREFERRED EMBODIMENTS

Referring to the accompanying drawings, a general encoding and decoding process will first be described before explaining the signal processor for a sub-band coding system according to the present invention. More specifically, the encoding and decoding method known as the Masking pattern adapted Universal Sub-band Integrated Coding And Multiplexing (MUSICAM) regime, which was developed through the cooperative efforts of CCETT, IRT, Philips and Matsushita, will be described.

The encoding process begins after the collection of 12 sample data for each of 32 sub-bands with a step whereby the maximum absolute value $|S_{max}|$ is obtained and then $SF_i$ is obtained. When S represents sample data, S' represents encoded data, and $SF_i$ represents the scale factor index, the quantities are related according to equation (1) as follows:

$$S' = \frac{S}{[|S_{max}|]_{2dB}} = \frac{S}{SF_i} \quad (1)$$

Next, the values in equation (1) are converted into decibel (dB) values by taking the log of both sides of equation (1), as follows:

$$S'(dB) = S(dB) - SF_i(dB) \quad (2)$$

Since the value of $SF_i(dB)$ has been already obtained in the first step, if S is converted into the value of S(dB), the value of S'(dB) can be obtained by an arithmetic operation.

Then, S' is obtained by finding the antilog of S'(dB), and S' is quantized, in accordance with the following equation to become S".

$$S'' = A \cdot S' + B \quad (3)$$

It will be appreciated that the value of a coefficient pair (A,B) is subject to change in accordance with the allocation information and a quantization coefficient q.

Preferably, if the value of the coefficient (A, B) is expressed as a binary digit, S" of the coefficient (A, B) is obtained by obtaining any of the coded bits expressed as binary digits, inverting the coded bits and then processing the data with a multiplier and an adder.

The quantization process is advantageously finalized by taking the number of bits, starting from the most significant bit (MSB) of the value S", equal to the number of the bits corresponding to the allocation information.

Finally, the scale factor index, allocation information, quantized data and system information obtained from the above steps are adjusted in accordance with the selected frame format of the sub-band coding system and then output as 32 bit data.

Preferably, the decoding process starts with a step for receiving encoded data from which the quantized data S" are dequantized. The operation to dequantize the data is performed according to the following relations:

$$S' = C(S'' + D) \quad (4)$$
$$= (1 + K)(S'' + D) \quad (5)$$
$$= (S'' + D) + K(S'' + D) \quad (6)$$

where C, D and K are coefficients, and C equals the sum of 1 plus K, i.e., C=1+K. The dequantized coefficient table of FIG. 9, which will be discussed in greater detail below, indicates the binary expressions of D and K and coefficients thereof.

Preferably, descaling is then performed in order to convert the dequantized result back into the original data value. Since the data is divided by $SF_i$ at the time of scaling during the encoding process, the data is multiplied by $SF_i$ at the time of descaling. That is to say, $$S = S' \cdot SF_i \quad (7)$$

Taking the log of both sides of equation (7) yields dB values as follows:

$$S(dB) = S'(dB) + SF_i(dB) \quad (8)$$

It will be appreciated that if the scale factor index value among the encoded data is converted into a dB value, the value of $SF_i$ (dB) in equation (8) becomes a dB value of an integer form. When the original value of S is obtained by applying an antilogarithmic expression to the S(dB) value obtained by addition (refer to equation (2)), the descaling operation is finalized. Then, the sample data S obtained by equation (8) is output in the same order as that of the data input at the time of encoding.

Now, the signal processor for performing the above encoding and decoding processes in the sub-band coding system according to the present invention will be explained.

Figure 3:
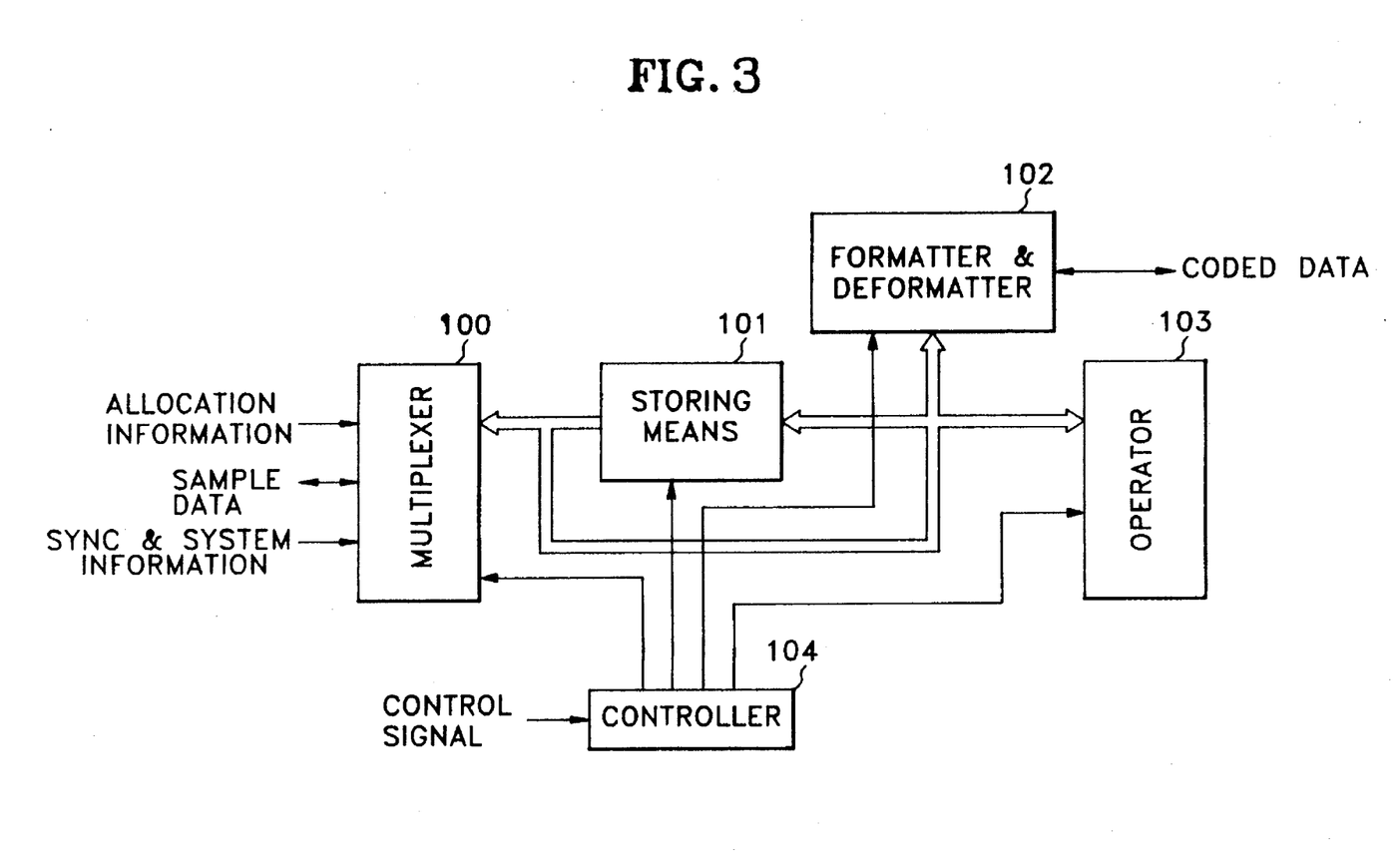
FIG. 3 is a high level block diagram of a circuit for performing data encoding and decoding in a general sub-band coding system according to the present invention.

FIG. 3 is a block diagram of the encoding and decoding system according to the present invention, wherein the system preferably includes a multiplexer 100, a storing means 101, e.g., a memory device, an operator 103, a formatter and deformatter 102, acting as a classifying means, all of which are mutually interconnected, and a controller 104, which advantageously is connected to control the respective components. The system configuration shown FIG. 3 advantageously performs encoding and decoding in one signal processing system, eliminating the need for providing or installing the respective separate circuits, in contrast to the conventional system.

The functions of the respective components are as follows. The multiplexer 100 receives various data, ie., sample data, allocation information, synchronization and system information, and modifies them into appropriate forms, e.g., serial to parallel conversion, and then outputs such modified data to other blocks, for performing the encoding operation.

The storing means 101 advantageously is used for temporarily storing the various data received from the multiplexer 100. It will be appreciated that the data are stored to permit the sample data to flow smoothly during scaling and quantizing and to prevent damage to the sample data. Preferably, at least the 384 samples of the sample data making up one frame should be stored. It will be noted that the storing means 101 also stores allocation information and scale factor index values.

The operator 103 includes a multiplier, an adder, a subtractor, a shift register and a comparator, for selectively scaling and quantizing the sample data or dequantizing and descaling the encoded data, as explained in greater detail below.

The formatter and deformatter 102, advantageously outputs the encoded data by adjusting the operated data and the allocation and system information input to the operator 103 in accordance with the frame format of the general sub-band coding system, or receives the encoded data and again classifies it into the system information, allocation information and operated data.

Preferably, controller 104 determines whether all data blocks are encoded or decoded and then generates the control signals appropriate for initiating the required functions. The controller 104 may advantageously be constructed to permit linkage with an external microprocessor.

Figure 4:
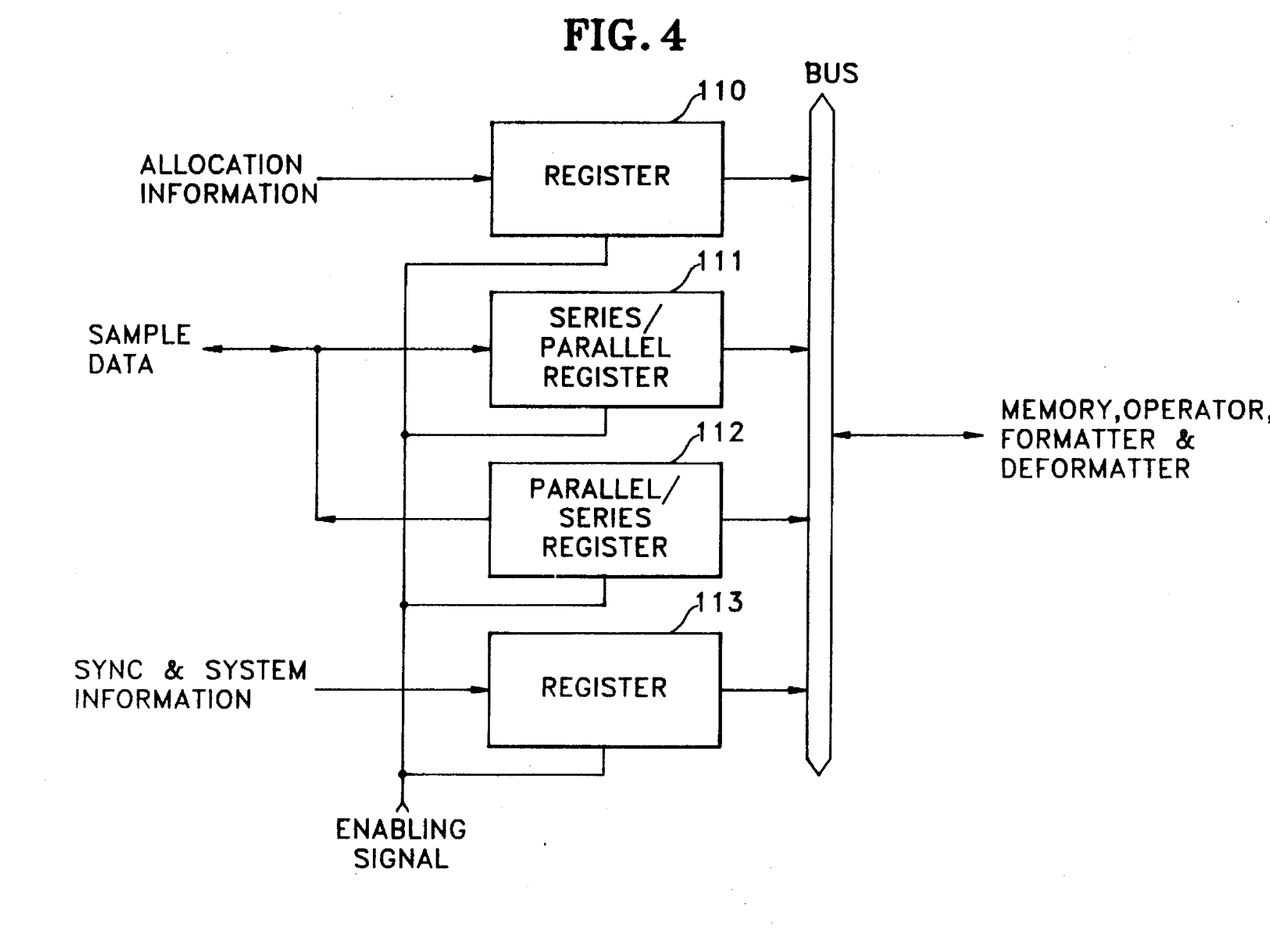
FIG. 4 is a low level block diagram of an embodiment of the multiplexer shown in FIG. 3.

FIG. 4 is a block diagram of an embodiment of the multiplexer shown in FIG. 3, wherein the multiplexer advantageously includes a register 110 for inputting allocation information in response to an enabling signal from the controller 104, a series/parallel register 111 receiving 12 sample data in series in response to the enabling signal and generating paralleled sample data, a parallel/series register 112 receiving the parallel output signals in response to the enabling signal and for generating serial signals, and a register 113 for receiving synchronization and system information in response to the enabling signal. Preferably, the multiplexer 100 receives 12 samples for each sub-band.

The information output by the multiplexer 100 is output to the storing means 101, formatter and deformatter 102 and operator 103 via interconnecting buses.

Figure 5:
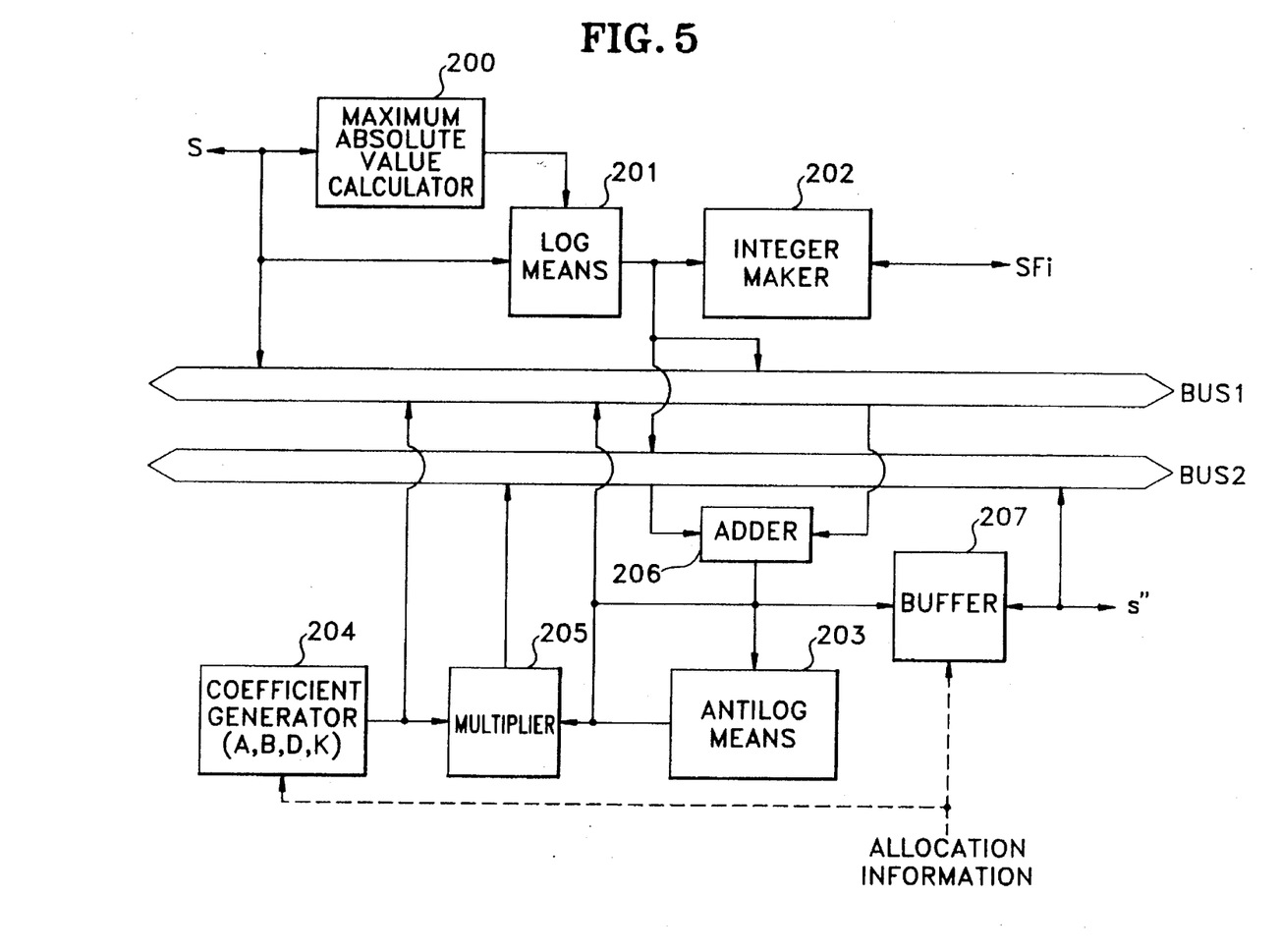
FIG. 5 is a low level block diagram of an embodiment of the operator shown in FIG. 3.

FIG. 5 is a block diagram of the operator 103 shown in FIG. 3, wherein the operator 103 advantageously includes a maximum absolute value calculator 200, a log means 201, an integer maker 202, an antilog means 203, an (A, B, D and K) coefficient generator 204, a multiplier 205, an adder 206, a buffer 207 and buses BUS1 and BUS2 for signal transmission.

During the encoding operation performed by the operator 103 shown in FIG. 5, the maximum absolute value calculator 200 calculates the maximum absolute value $|S_{max}|$ among 12 sample data for each sub-band. The log means 201 receives the maximum absolute value $|S_{max}|$ from the maximum absolute value calculator 200 and obtains the value $SF_i(dB)$. The integer maker 202 receives $SF_i(dB)$ and then obtains scale factor index value $SF_i$. That is to say, the integer maker 202 includes the indices corresponding to the value of $SF_i(dB)$. Advantageously, the log means 201, e.g., a log circuit, also receives the respective sample data and then obtains the value of $S(dB)$. The adder 206 performs the operation of the equation (2) and thereby obtains the value of $S'(dB)$. The antilog means 203 receives the value of $S'(dB)$ and then obtains the value of $S'$. The multiplier 205, adder 206 and coefficient generator 204 perform the operations of equation (3) to thereby generate $S''$, which is the quantized value of $S'$. The buffer 207 stores the value of $S''$ and later outputs it, starting from the uppermost bit and continuing for the number of bits corresponding to the allocation information.

Preferably, the decoding operation performed by the operator 103 shown in FIG. 5, starts with storing the value of $S''$ in buffer 207. The multiplier 205, adder 206 and coefficient generator 204 perform the operations of equations (4)–(6) to thereby obtain the value of $S'$ from the value of $S''$. The log means 201 receives the value of $S'$ and then obtains the value of $S'(dB)$. The integer maker 202 receives the value of $SF_i$ and then obtains the value of $SF_i(dB)$. The adder 206 adds the values $S'(dB)$ and $SF_i(dB)$, which antilog 203 receives as the value of $S(dB)$ and then obtains the value of $S$.

It will be appreciated that both encoding and decoding processes can be advantageously performed using one single circuit, as shown in FIG. 5.

Figure 6:
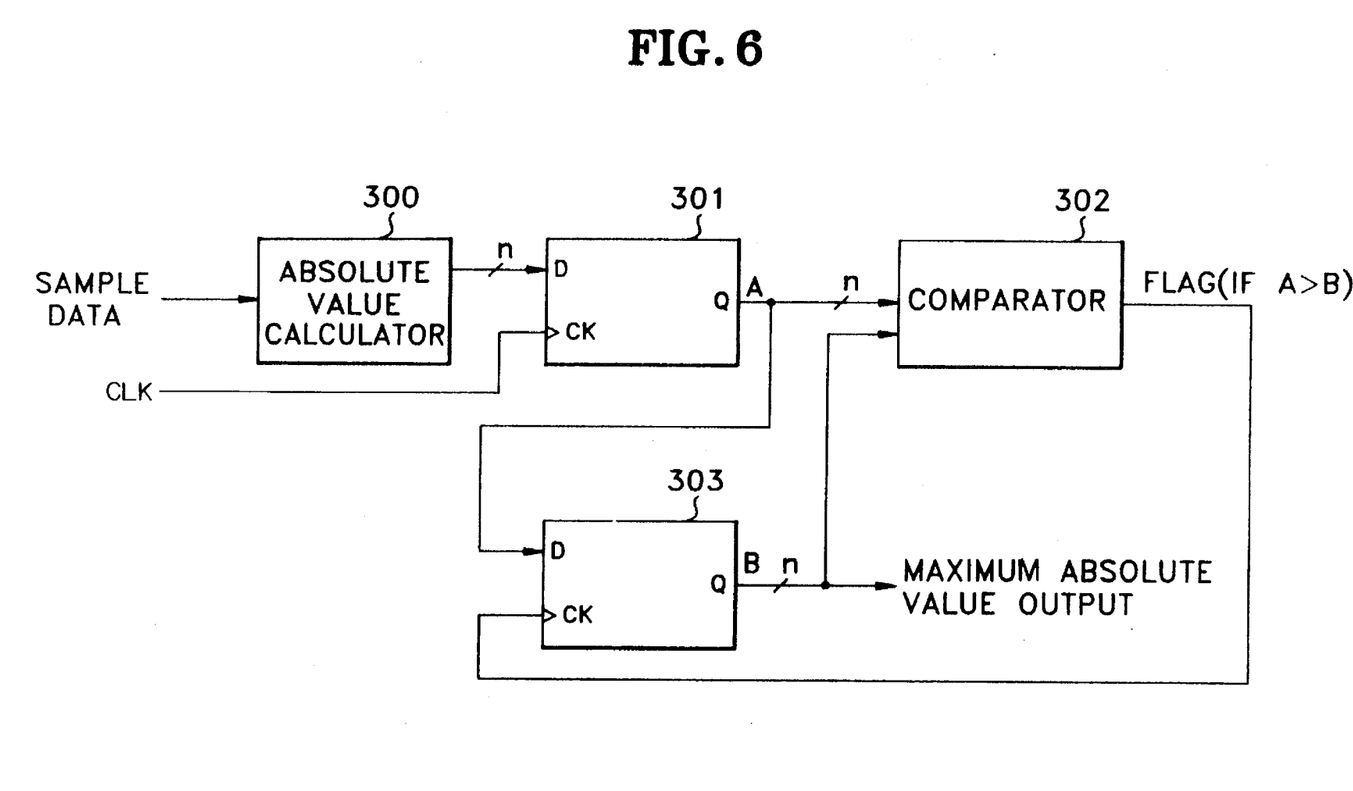
FIG. 6 is a detailed block diagram of an embodiment of the maximum absolute value calculator shown in FIG. 5.

FIG. 6 is a block diagram of the maximum absolute value calculator shown in FIG. 5, wherein the maximum absolute value calculator 200 includes an absolute value calculator 300 receiving sample data S and calculating the absolute value thereof, a register 301 for storing and reproducing the output signal of the absolute value calculator 300 in response to a clock signal CLK, a comparator 302 receiving and comparing the output signal of the register 301 with a previous maximum absolute value and then generating a flag signal if the output signal of the register 301 is greater than the previous maximum absolute value, and a register 303 for storing the output signal of the register 301 in response to the output signal of the comparator 302 and generating the current maximum absolute value. The maximum absolute value calculator having the above-described configuration outputs the maximum absolute value $|S_{max}|$ of the sample datas received thereby.

Figure 7:
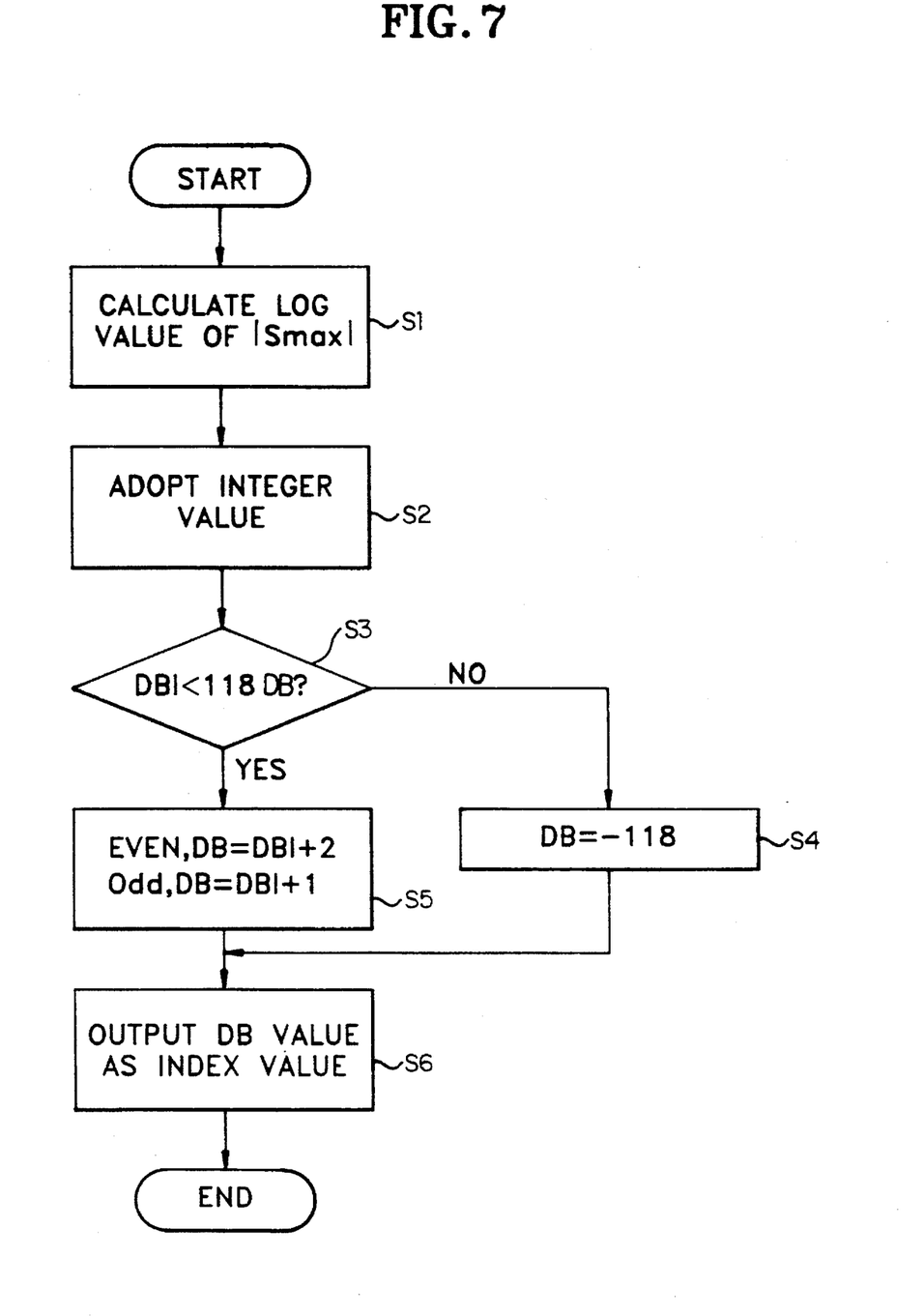
FIG. 7 is an operational flowchart which is useful in understanding the process for obtaining the index value from the maximum absolute value.

FIG. 7 is an operational flow chart for explaining the process for generating an index value from the maximum absolute value $|S_{max}|$. The flow chart illustrates steps for obtaining the value of the digital bit rate (DBR) by calculating the logarithm of the maximum absolute value $|S_{max}|$ and converting it into a dB value during step S1, obtaining the value of a digital bit integer (DBI) by adopting an integer value to the DBR value obtained in step S1 during step S2, determining whether or not the DBI value obtained in step S2 is less than a –118 dB value during step S3, adopting the dB value as –118 DB if the DBI value is greater than –118 dB in step S3 during step S4, adding 2 to the DBI value if the DBI value is an even number and 1 if the DBI value is an odd number with respect to the case that the DBI value is less than –118 DB in step S3 during step S5 and providing the finally calculated dB value after performing the processes of steps S4 and S5 as the index value corresponding to the DB value during step S6. By performing such operations, the dB value of the maximum absolute value $|S_{max}|$ is advantageously calculated. The dB value preferably is between +6 and –118 and the values are spaced apart by 2dB. The operation shown in FIG. 7 can advantageously be performed by a microprocessor.

Hereinafter, an operating description of the system will be made using exemplary values to promote the understanding of the present invention, starting with the encoding process.

Assume that the maximum absolute value $|S_{max}|$ among 12 samples is 0.480000000 and one value among the sample data is 0.375000000.

First, the maximum absolute value $|S_{max}|$ is converted to a dB value to thereby obtain a signal value DBR and this value is made an integer value to then output a signal DBI. The operation for obtaining a scale factor index is shown in FIG. 7 and the index is searched by using the table shown in FIG. 11.

DBR=–6.3752

DBI=–7

Since the above value is an odd number, 1 is added. Then, the index becomes –6; that is, dB=–6.

Scaling is then performed, e.g., normalization is performed to produce a value between –1 and 1.

$S(dB)$=–8.5194

$$S(dB) - SF_i(dB) = -8,5194 - (-6)$$
$$= -2.5194$$

$S'$=0.7482; so that the scaling value becomes 0.7482.

Figure 8:
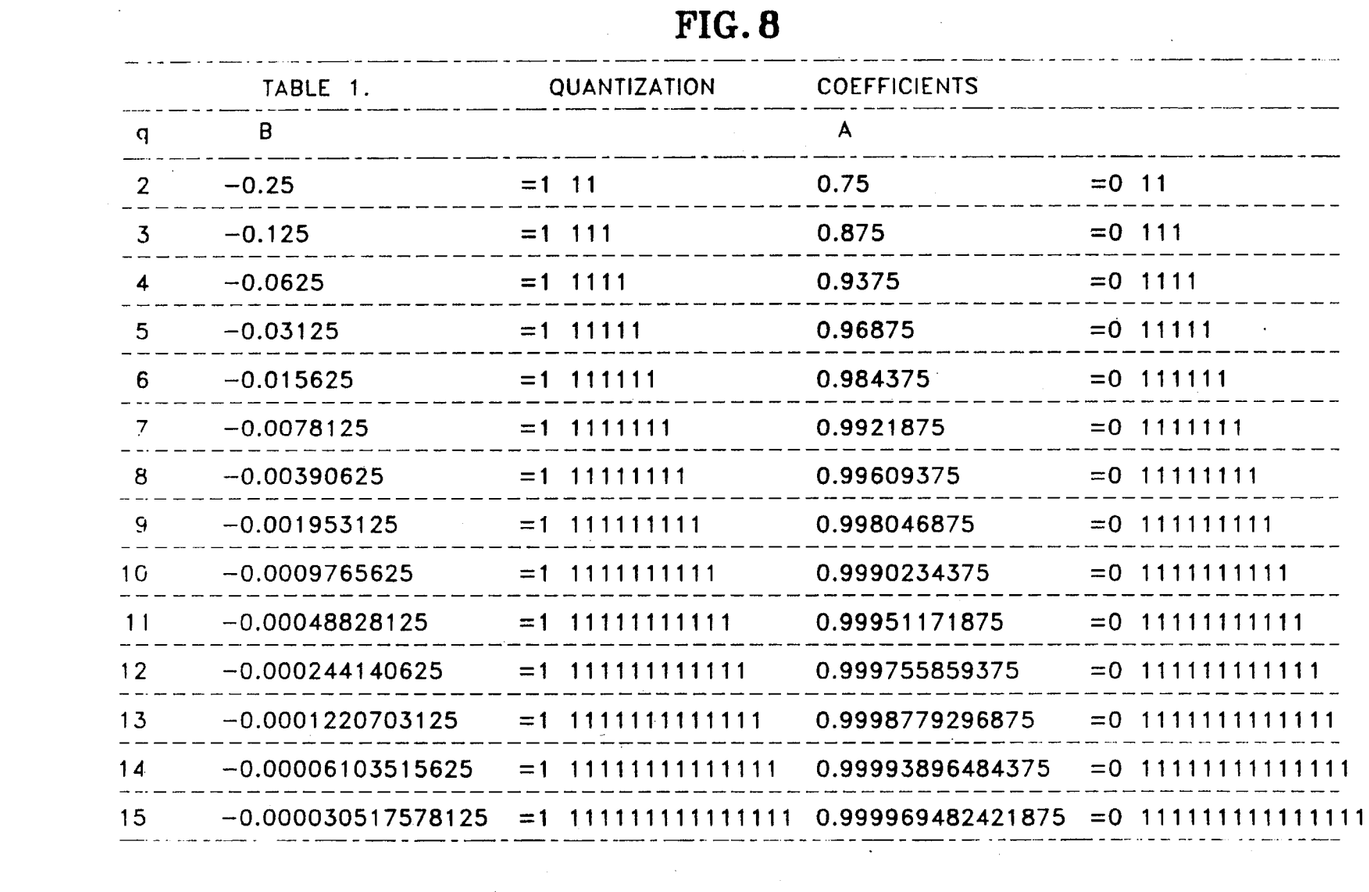
FIG. 8 is a table showing quantized coefficients.

Then, a quantization step is performed by using the coefficient values A and B shown in the table of FIG. 8.

In the exemplary case where the quantization coefficient q equals 4, A is 0.9375 and B is –0.0625. Therefore, $$S''=0.9347*0.7482-0.0625=0.6390$$

where 0.6390 is expressed as 0.101000111 in binary digits.

Since q equals 4, if only 4 bits are taken starting from the most significant bit, S" becomes 0.625.

Hereinafter, the decoding process will be described. First, dequantization is performed. The operation of dequantization is performed after obtaining the values D and K by using the tables shown in FIGS. 9 and 10, respectively.

$$S''=0.625$$

$$S'=(S''+D)+K(S''+D)$$

Figure 9:
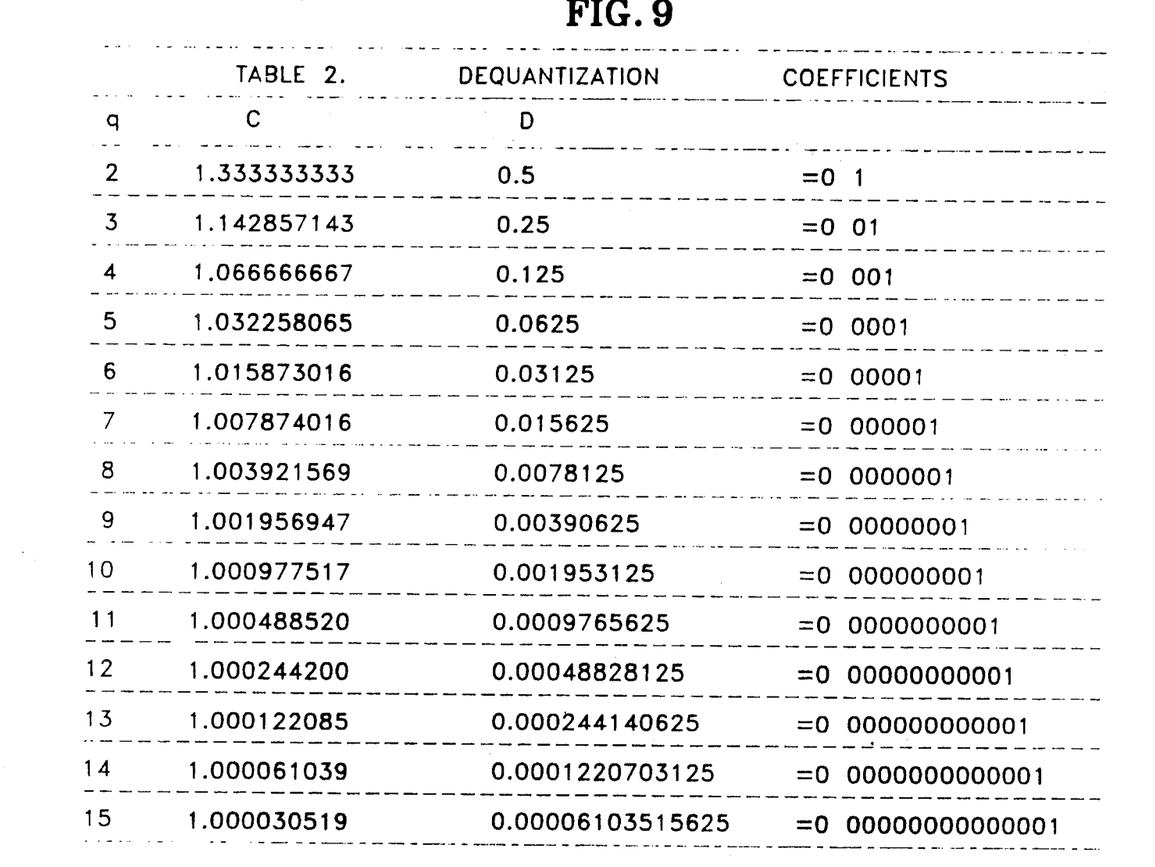
FIG. 9 is a table showing dequantized coefficients.
Figure 10:
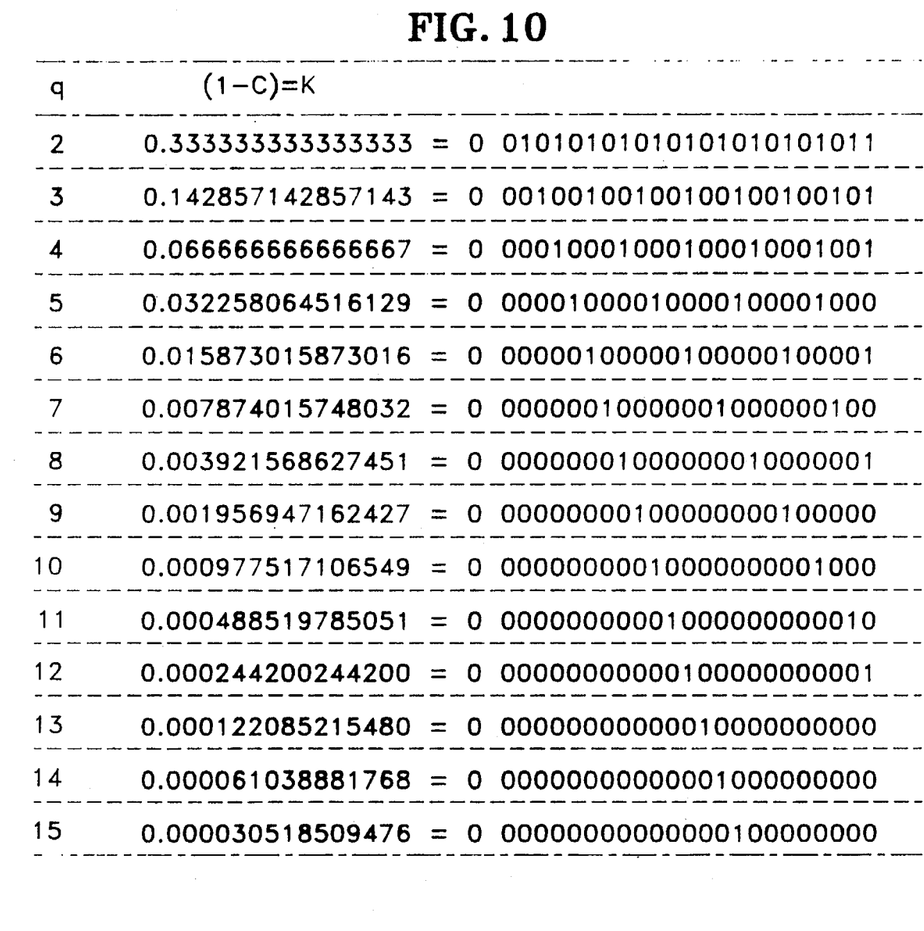
FIG. 10 is a table showing K values.

In the exemplary case, where the quantization coefficient q equals 4, D is 0.125 and K is 0.066666667. Therefore, $$\begin{aligned} S' &= (0.625+0.125)+0.066666667(0.625+0.125) \\ &= 0.75+0.05 \\ &= 0.8 \end{aligned}$$

Preferably, descaling is then performed. As with the scaling operation, the descaling operation is also performed using the table shown in FIG. 11.

$$S'(dB)=-1.938$$

$$SF_i(dB)=-6$$

$$\begin{aligned} S'(dB)+SF_i(dB) &= -1.938+(-6) \\ &= -7.938 \end{aligned}$$

$$S=0.4$$

In other words, it will be appreciated that unencoded input sample data value 0.375 and decoded value 0.4 are close approximation values to one another. The encoding and decoding of the sub-band coding system advantageously is performed by such operations as described above. Therefore, the signal processor for the sub-band coding system according to the present invention provides an effective circuit configuration whereby only one single circuit configuration performs both operations, making separate configurations for encoding and decoding unnecessary and, thus, simplifying the circuitry of the overall system.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A signal processor for a subband coding system comprising:

selecting means receiving sample data, allocation information, and synchronization and system information during an encoding operation for changing said sample data to another form and thereby providing various data corresponding to said sample data, said allocation information and said synchronization and system information and for transforming said various data to said sample data during a decoding operation;

first storing means for temporarily storing said various data received from said selecting means during said encoding operation and provided to said selecting means during said decoding operation;

operating means for selectively scaling and quantizing unencoded sample data to thereby produce operated data during said encoding operation and dequantizing and descaling said operated data included in encoded data during said decoding operation;

classifying means for selectively providing said operated data, said allocation information input to said operating means, and said synchronization and system information in accordance with a frame format for a general subband coding system as said encoded data during said encoding operation, and for receiving said encoded data and classifying said encoded data into said synchronization and system information, said allocation information and said operated data during said decoding operation; and control signal generating means for generating control signals for selectively controlling said encoding operation and said decoding operation performed by said selecting means, said storing means, said operating means and said classifying means.

2. The signal processor for a subband coding system as claimed in claim 1, wherein said selecting means comprises:

second storing means for storing said allocation information received in response to an enabling signal;

a series/parallel register for receiving serial sample data corresponding to 12 samples in response to said enabling signal and for providing parallel output data;

a parallel/series register receiving said parallel output data from said series/parallel register in response to said enabling signal for providing said serial sample data; and third storing means receiving said synchronization and system information in response to said enabling signal;

wherein said selecting means outputs 12 samples for each subband.

3. The signal processor for a subband coding system as claimed in claim 1, wherein said operating means comprises:

first buffering means for temporarily storing sample data and for providing decoded values;

maximum absolute value calculating means receiving a predetermined number of sample data for obtaining a maximum absolute value from among said predetermined number of sample data during said encoding operation;

log means for generating a first logarithmic value and a second logarithmic value representing said maximum absolute value and one of said sample data, respectively, during said encoding operation, and for generating a third logarithmic value representing dequantized said sample data during said decoding operation;

first adding means for receiving and subtracting an integer value representing a decibel value corresponding to said first logarithmic value to which is added 1 if said integer value is an even number and to which is added 2 if said integer value is an odd number from said second logarithmic value during said encoding operation and for receiving and adding said third logarithmic value with said integer value during said decoding operation and providing a resultant value as said decoded value to said first buffering means;

antilog means for generating a first antilog value of each respective output of said first adding means during said encoding operation;

coefficient generating means for generating a first coefficient and a second coefficient representing a quantization coefficient during said encoding operation and a third coefficient and a fourth coefficient for use during said decoding operation;

multiplying means receiving said first antilog value for multiplying said first antilog value by said first coefficient to produce an encoding value during said encoding operation, and for providing said dequantized said sample data and for multiplying said third coefficient plus 1 by a sum of said operated data plus said fourth coefficient during said decoding operation;

second adding means for adding said encoding value of said multiplying means to said second coefficient to thereby produce said operated data during said encoding operation and for adding said operated data to said fourth coefficient to thereby produce said sum during said decoding operation; and second buffering means for temporarily storing said sum output by said second adding means and for providing said sum to said multiplying means.

4. The signal processor for a subband coding system as claimed in claim 3, wherein said maximum absolute value calculating means comprises:

absolute value calculating means receiving said sample data for calculating an absolute value of a current sample and providing a current absolute value;

a first register for storing and providing the current absolute value output by said absolute value calculating means in response to a clock signal applied thereto;

a comparator receiving the current absolute value output by said first register and a previously occurring maximum absolute value, for comparing the current absolute value with the previous maximum absolute value and providing an output signal when the current absolute value is greater than said previous maximum absolute value; and a second register for storing the current absolute value output from said first register in response to the output signal of said comparator to thereby generate a maximum absolute value.

5. A signal processor for a subband coding system comprising:

selecting means receiving sample data, allocation information, and synchronization and system information during an encoding operation for changing said sample data to another form and thereby providing various data corresponding to said sample data, said allocation information and said synchronization and system information and for providing said sample data during a decoding operation;

first storing means for temporarily storing said various data received from said selecting means during said encoding operation;

operating means for selectively scaling and quantizing unencoded sample data to thereby produce operated data during said encoding operation and for dequantizing and descaling said operated data included in encoded data during said decoding operation;

classifying means for selectively providing said operated data, said allocation information input to said operating means, and said synchronization and system information in accordance with a frame format for a general subband coding system as said encoded data during said encoding operation, and for receiving said encoded data and classifying said encoded data into said synchronization and system information, said allocation information and said operated data during said decoding operation; and control signal generating means for generating control signals for selectively controlling said encoding operation and said decoding operation performed by said selecting means, said storing means, said operating means and said classifying means.

6. The signal processor for a subband coding system as claimed in claim 5, wherein said selecting means comprises:

second storing means for storing said allocation information received in response to an enabling signal;

a series/parallel register for receiving serial sample data corresponding to 12 samples in response to said enabling signal and for providing parallel output data;

a parallel/series register receiving said parallel output data in response to said enabling signal for providing said serial sample data; and third storing means receiving said synchronization and system information in response to said enabling signal.

7. The signal processor for a subband coding system as claimed in claim 6, wherein said selecting means processes 12 samples for each subband.

8. The signal processor for a subband coding system as claimed in claim 5, wherein said operating means comprises:

buffering means for temporarily storing sample data, interim data and operated data;

maximum absolute value calculating means for calculating a maximum absolute value from a predetermined number of sample data during said encoding operation;

log means for generating a first logarithmic value based upon said maximum absolute value, a second logarithmic value representing one of said sample data during said encoding operation, and for generating a third logarithmic value representing dequantized operated data during said decoding operation;

coefficient generating means for generating a first coefficient and a second coefficient representing a quantization coefficient during said encoding operation and a third coefficient and a fourth coefficient for use during said decoding operation;

adding means combining said first and said second logarithmic values and for combining an encoding value output by a multiplying means to said second coefficient to thereby produce said operated data during said encoding operation, for combining said third logarithmic value with said first logarithmic value and for adding said operated data to said fourth coefficient to thereby produce a sum of said operated data plus said fourth coefficient during said decoding operation;

antilog means for generating a first antilog value of each respective output of said adding means during said encoding operation; and said multiplying means receiving said first antilog value for multiplying said first antilog value by said first coefficient to produce an encoding value during said encoding operation, and for providing said dequantized said sample data and for multiplying said third coefficient plus 1 by said sum during said decoding operation.

9. The signal processor for a subband coding system as claimed in claim 8, wherein said maximum absolute value calculating means comprises:

absolute value calculating means receiving said sample data for calculating an absolute value of a current sample and providing a current absolute value;

a first register for storing and providing the current absolute value output by said absolute value calculating means in response to a clock signal applied thereto;

a comparator receiving the current absolute value output by said first register and a previously occurring maximum absolute value, for comparing the current absolute value with the previous maximum absolute value and providing an output signal when the current absolute value is greater than said previous maximum absolute value; and a second register for storing the current absolute value output from said first register in response to the output signal of said comparator to thereby generate a maximum absolute value.

10. A method for operating a signal processor for a subband coding system including: a selector receiving sample data, allocation information, and synchronization and system information during an encoding operation for providing various data corresponding to said sample data, said allocation information and said synchronization and system information and for providing said sample data during a decoding operation; a memory temporarily storing said various data during said encoding and said decoding operations; an operating circuit selectively scaling and quantizing unencoded sample data to thereby produce operated data and dequantizing and descaling said operated data included in encoded data, said operating circuit including a buffer temporarily storing sample data, a plurality of interim values and said operated data, a maximum absolute value calculator, a log circuit, a coefficient generator, an adder, an antilog circuit and a multiplier; a classifier selectively providing said operated data, said allocation information input to said operating means, and said synchronization and system information in accordance with a frame format for a general subband coding system as said encoded data during said encoding operation, and for receiving said encoded data and classifying said encoded data into said synchronization and system information, said allocation information and said operated data during said decoding operation; and a control signal generator generating control signals for selectively controlling said encoding operation and said decoding operation performed by said selector, said memory, said operating circuit and said classifier, said method comprising the steps of:

encoding said sample data to produce operated data by the steps of:
(a) calculating a first log value representing the maximum absolute values of a predetermined number of sample data using said log circuit;
(b) calculating respective log values of said sample data;
(c) arithmetically combining said first log values with said respective log values to thereby produce first interim values using said adder;
(d) calculating respective antilog values of said respective first interim values using said antilog circuit;
(e) adding a product of said respective antilog values and a first coefficient provided by said coefficient generator using said multiplier with a second coefficient from said coefficient generator using said adder to thereby produce said operated data; and decoding said operated data to provide said sample data by the steps of:
(f) adding said operated data to a third coefficient using said adder to produce second interim data;
(g) multiplying said second interim data with a value corresponding to a fourth coefficient plus an integer using said multiplier to produce a third interim value;
(h) adding said second interim value to said third interim value to thereby produce a fourth interim value using said adder:
(i) calculating a fourth log value using said log circuit;
(j) combining said fourth log value and a value approximating said first log value using said adder to produce a fifth interim value; and
(k) calculating said sample data using said antilog circuit.

* * * * *